United States Patent [19]
Okajima et al.

[11] Patent Number: 6,021,516
[45] Date of Patent: Feb. 1, 2000

[54] COMMUNICATION SYSTEM AND TRANSMISSION STATION

[75] Inventors: Ichiro Okajima; Akihiro Maebara; Katsumi Kobayashi, all of Kanagawa; Koji Sasada, Tokyo; Hiroyuki Hattori, Kanagawa, all of Japan

[73] Assignee: NTT Mobile Communications Network, Inc., Japan

[21] Appl. No.: 08/786,479

[22] Filed: Jan. 21, 1997

[30] Foreign Application Priority Data

Jan. 23, 1996 [JP] Japan ................................. 8-009388

[51] Int. Cl.[7] ............................. G08C 25/02; H04L 1/18
[52] U.S. Cl. ............................................ 714/748; 714/749
[58] Field of Search .................................. 714/748, 749, 714/751, 752, 758, 809, 821

[56] References Cited

U.S. PATENT DOCUMENTS

| | | | |
|---|---|---|---|
| 5,210,751 | 5/1993 | Onoe et al. | 371/32 |
| 5,533,034 | 7/1996 | Kuwata et al. | 371/32 |
| 5,629,948 | 5/1997 | Hagiwara et al. | 371/32 |

FOREIGN PATENT DOCUMENTS

| | | |
|---|---|---|
| 1-252037 | 10/1989 | Japan . |
| 7-123081 | 5/1995 | Japan . |

*Primary Examiner*—Hoa T. Nguyen
*Attorney, Agent, or Firm*—Brinks Hofer Gilson & Lione

[57] ABSTRACT

In a communication system having a transmission station which transmits the data signal and a receiving station which receives the data signal, the transmission station consists of an adding means for adding an error detecting code showing a position of a transmission error, which occurs on said data signal, in said data signal to said data signal and a retransmission means for retransmission of a part in said data signal when said receiving station requests the retransmission of the part in said data signal. The receiving station consists of a judgment means for judging a position of the transmission error in said data signal on the basis of the error detecting code which is added by the adding means and a request means for requesting the retransmission of the part containing the transmission error in the data signal on the basis of the position of the transmission error.

11 Claims, 14 Drawing Sheets

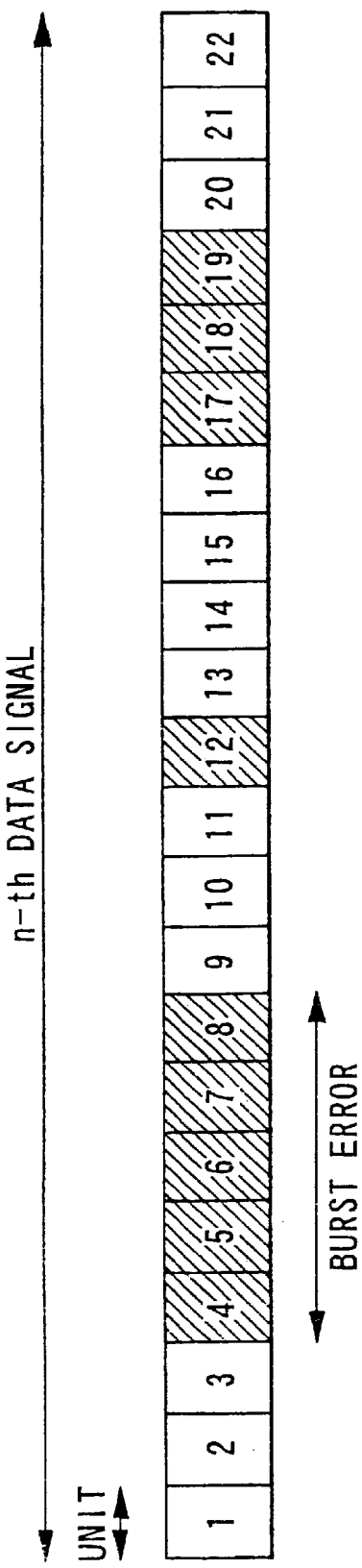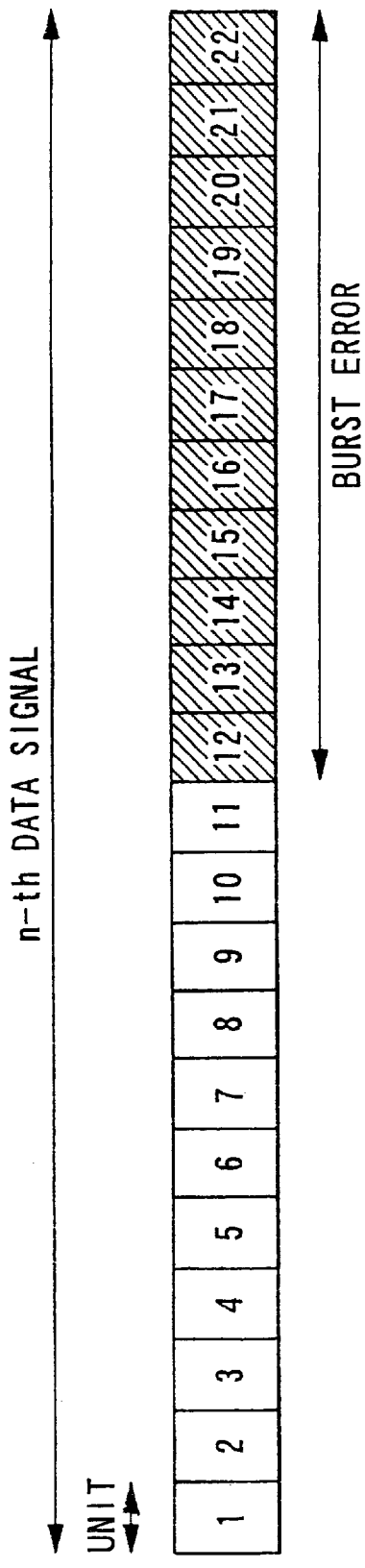

FIG.13

| | 1 | 2 | 3 | 4 | 5 | 6 | 7 | 8 |
|---|---|---|---|---|---|---|---|---|
| 1 | SIGNAL TYPE (PARTIAL SELECTION RETRANSMISSION REQUEST) ||||||||
| 2 | DATA SIGNAL NUMBER (n) |||||||| 
| 3 | RETRANSMISSION UNIT NUMBER (4) |||||| CONTINUATION (1) ||
| 4 | RETRANSMISSION UNIT NUMBER (8) |||||| CONTINUATION (0) ||
| 5 | RETRANSMISSION UNIT NUMBER (12) |||||| CONTINUATION (0) ||
| 6 | RETRANSMISSION UNIT NUMBER (17) |||||| CONTINUATION (1) ||
| 7 | RETRANSMISSION UNIT NUMBER (19) |||||| CONTINUATION (0) ||

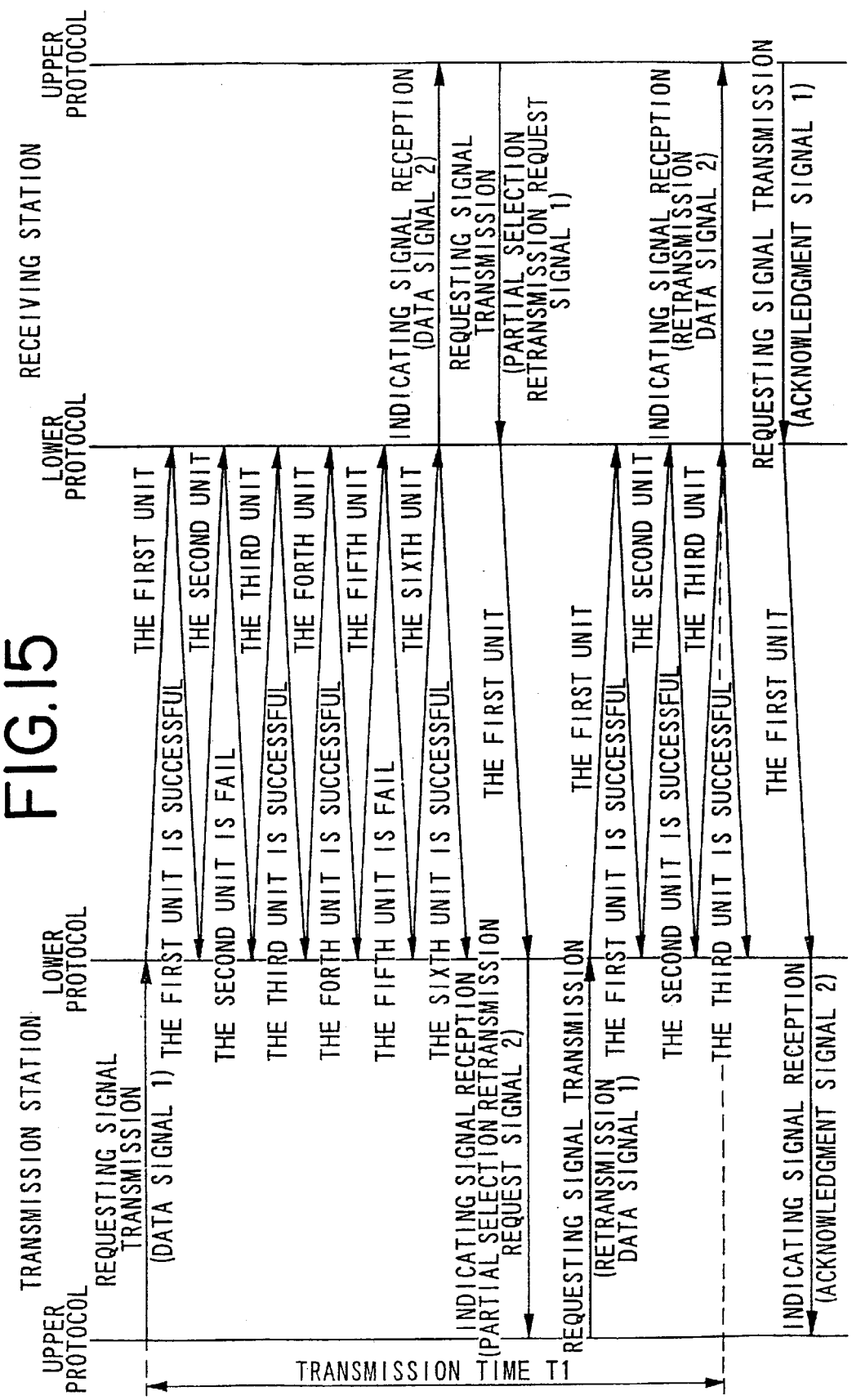

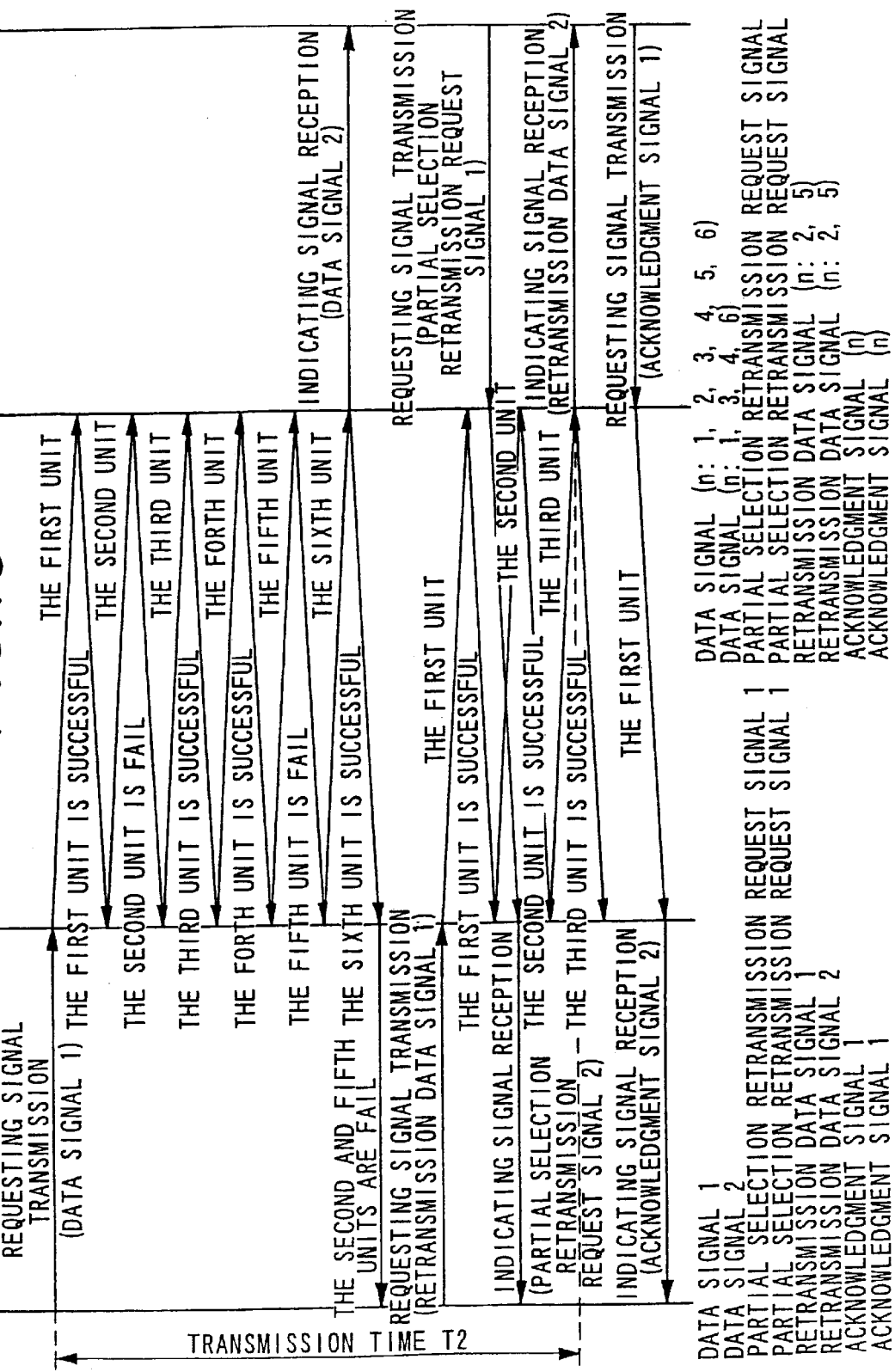

COMMUNICATION SYSTEM AND TRANSMISSION STATION

BACKGROUND OF THE INVENTION

1. Field of the Invention

The present invention relates to a communication system and a transmission station which can retransmit data in which a transmission error has occurred, and in particular relates to a communication system and a transmission station which can finish transmission as soon as possible even when a transmission error has occurred, and can decrease traffic in the retransmission of the data.

2. Background

In conventional communication systems which transmit data bidirectionally, the receiving side requests retransmission of data by transmitting a data retransmission request signal to the transmitting side when an error in the data signal is detected. When the receiving side receives a data signal correctly, it provides notification that the data signal was received correctly by transmitting an acknowledgment signal to the transmitting side. When the transmitting side receives a data retransmission request signal, it retransmits the data signal. The transmitting side then transmits the next data signal after it receives an acknowledgment signal from the receiving side.

When the transmission delay in a line is small, then the time until the transmitting side receives the acknowledgment signal or the retransmission request signal is short. Thus, the transmitting side can immediately transmit the next data or the data for retransmission. However, when the transmission delay in the line is large, then the time until the transmitting side receives the acknowledgment signal or the retransmission request signal is long. As a result, the next data or the data for retransmission cannot be sent immediately, causing the rate of utilization of the line to deteriorate.

The transmitting side carries out outstanding transmission in which it transmits data a predetermined number of data signal frames, without receiving an acknowledgment signal or a retransmission request signal from the receiving side. The number of data frames which are transmitted in succession without receiving an acknowledgment signal is referred to as the "outstanding number."

In outstanding transmission, the acknowledgment signal has an identification number for identifying a data signal frame for which receipt has been confirmed. The retransmission request signal has an identification number for identifying a data signal frame for which retransmission has been requested. The transmitting side recognizes which data signal frame has been correctly transmitted by using the identification number of the acknowledgment signal. The transmitting side also recognizes a data signal frame to be retransmitted on the basis of the identification number of the retransmission request signal.

Among the methods for retransmitting data in outstanding transmission, there are available methods such as the GO BACK N method, which retransmits the data requested for retransmission and all data thereafter, and the SELECTIVE REJECT retransmission method, which retransmits only the data which is requested for retransmission.

FIG. 9 is a sequence diagram showing the data retransmission sequence in the GO BACK N method. The numbers in the brackets show each value of the identification number of the data signal. The data signals having from 11 to 15 as the identification number, that is, from data signal (11) to data signal (15), are transmitted continuously from station 10 to station 20. When an error occurs in data signal (12), station 20 transmits retransmission signal (12) by using identification number 12. Station 10 retransmits all data on and after the data (12) requested for retransmission. In other words, station 10 retransmits the data from data signal (12) to data signal (15).

FIG. 10 is a sequence diagram showing the data retransmission sequence in the SELECTIVE REJECT retransmission method. When station 20 transmits selective retransmission request signal (12), station 10 retransmits data signal (12) only. In the GO BACK N method, data signals transmitted correctly are also retransmitted. However, in the SELECTIVE REJECT retransmission method, only the data signal in which an error has occurred is transmitted. Therefore, in the SELECTIVE REJECT retransmission method more data per unit time can be received than in the GO BACK N method.

However, in the both GO BACK N method and the SELECTIVE REJECT retransmission method, the traffic of the line increases due to the fact that correct data are retransmitted along with the data in which an error actually occurred. In the outstanding method, all correct data are retransmitted so that the traffic of the line increases still further. In particular, in the case where the quality of the line is poor, making it highly likely that retransmission will be necessary, the transmitting side must repeatedly transmit the same data signal. As a result, the time until the transmission of data is complete becomes longer. Further, in case where the quality of the line is poor, the transmitting side cannot transmit data and the line might be disconnected.

In general, the length of the data frame is inversely proportional to the probability of data retransmission. Therefore, in the case where the quality of the line is poor, it is possible to decrease the probability of data retransmission by making the data frame shorter. In this case, however, the transmitting side must transmit more data frames, so that the load on not only the transmitting side and the receiving side, but also on the switching apparatus present on the line increases. Also, the data transmission speed decreases because the receiving side must interpret the header for each data frame.

SUMMARY OF THE INVENTION

It is accordingly a primary object of the present invention to provide a communication system and a transmission station that are able to resolve the aforementioned problems.

In an aspect of the present invention, there is provided a communication system for the outstanding method having a transmission station which transmits a data signal and a receiving station which receives said data signal, wherein said transmission station consists of an adding means for adding error detecting code showing a position of a transmission error, which occurs on said data signal, in said data signal to said data signal, and a retransmission means for retransmitting a part in said data signal when said receiving station requests the retransmission of the part in said data signal, said receiving station consists of a judgment means for judging a position of said transmission error in said data signal on the basis of the error detecting code which is added by said adding means; and a request means for requesting the retransmission of the part containing said transmission error in said data signal on the basis of said position judged by said judgment means.

Furthermore, in an aspect of the present invention, there is provided a communication system according to claim 1, wherein said data signal has a plurality of units; said error detecting code is added to each of said plurality of units correspondingly, and said judgment means judges a position in said data signal of said unit containing said transmission error on the basis of said error detecting code.

Furthermore, in an aspect of the present invention, there is provided a transmission station for transmitting a data signal to a receiving station, wherein said data signal having an identification number, for identifying a number of the data signal and a plurality of information units; said transmission station consists of an adding means for adding an error detecting code according to each of said plurality of information units, a transmission means for transmitting a data signal which is added the error detecting code by said adding means to said receiving station, and a retransmission means for retransmitting an unit to said receiving station when said receiving station requests the retransmission of the unit in said data signal.

Furthermore, in an aspect of the present invention, there is provided a communication system for the outstanding method having a transmission station which transmits a data signal and a receiving station which receives said data signal, wherein said transmission station consists of an adding means for adding error detecting code showing a position of a transmission error, which occurs on said data signal, in said data signal to said data signal and a retransmission means for retransmitting a part in said data signal when said receiving station requests the retransmission of the part in said data signal, said receiving station consists of a judgment means for judging a position of said transmission error in said data signal on the basis of the error detecting code which is added by said adding means and a request means for requesting the retransmission of the part containing said transmission error in said data signal on the basis of said position judged by said judgment means, wherein said data signal has a plurality of units, said error detecting code is added to each of said plurality of units correspondingly, said judgment means judges a range of the continuous units when it judges that said transmission error has been occurred on each of continues units, and said retransmission request means requests the retransmission to said transmission station by designating the range of said continuous units which is judged by said judgment means.

Furthermore, in an aspect of the present invention, there is provided a communication system according to claim 4, wherein said retransmission means designates at least, a number of the head unit in said continuous units, a code showing that said continuous units are designated, and a number of the last unit in said continuous units, on designating said range of continuous units.

Furtherrnore, in an aspect of the present invention, there is provided a communication system according to claim 5, where in said retransmission means transmits a partial selection request signal having a signal type information showing that said partial selection request signal is a signal which requests the retransmission of the part containing said transmission error, a data signal number which is information for identifying the number of the data signal which requests the retransmission, at least a retransmission unit number which is information for identifying an unit which requests the retransmission and an unit continuous information showing whether said unit which requests the retransmission exists continuously or not, which is added to each of said retransmission unit number, when said retransmission means requests said retransmission to said transmission station.

Furthermore, in an aspect of the present invention, there is provided a communication system for the outstanding method having a transmission station which transmits a data signal and a receiving station which receives said data signal, wherein said transmission station changes the length of the data signal transmitted at a time in accordance with an occurrence frequency of the transmission error.

Furthermore, in an aspect of the present invention, there is provided a communication system according to claim 1, wherein said transmission station changes the length of the data signal transmitted at a time in accordance with an occurrence frequency of the transmission error.

Furthermore, in an aspect of the present invention, there is provided a communication system according to claim 8, wherein said transmission station further consists of an error frequency judgment means for judging an occurrence frequency of the transmission error on the basis of the signal which requests the retransmission of a part containing said transmission error in said data signal to said transmission station.

Furthermore, in an aspect of the present invention, there is provided a communication system according to claim 8, wherein said data signal has a plurality of units, said transmission station changes the number of units which are contained in the data signal, when it changes the length of the data signal transmitted at a time in accordance with an occurrence frequency of the transmission error.

Furthermore, in an aspect of the present invention, there is provided a communication system according to claim 8, wherein said data signal has a plurality of units, said transmission station changes information amount of each unit, when it changes the length of the data signal transmitted at a time in accordance with an occurrence frequency of the transmission error.

Furthermore, in an aspect of the present invention, there is provided a communication system according to claim 1, wherein said data signal has a plurality of units, said error detecting code is added to each of said plurality of units correspondingly, said judgment means judges a position in said data signal of said unit which contains said transmission error on the basis of the error detecting code, said communication system has a lower protocol for carrying out the transmitting and the receiving between said transmission station and said receiving station, said lower station judges each of said plurality of units whether the transmission succeeds or not, and said transmission station consists of an immediate retransmission means which recognizes said units which contain said transmission error by information from said lower protocol, and retransmits immediately the recognized unit as the retransmission data signal after the recognition.

Furthermore, in an aspect of the present invention, there is provided a communication system according to claim 1, wherein said data signal has a plurality of units, said error detecting code is added to each of said plurality of units correspondingly, said judgment means judges a position in said data signal of said unit which contains said transmission error on the basis of the error detecting code, said transmission station consists of an immediate retransmission means which recognizes said units which contain said transmission error by information from said lower protocol, and retransmits immediately the recognized unit as the retransmission data signal after the recognition, when said receiving station requests the retransmission of a part which contains the transmission error, in the case where all units in the part requested the retransmission are retransmitted already, said transmission station does not answer for the request of the retransmission, on the other hand, in the case where there is an unit which is not retransmitted in the part requested the retransmission, said transmission station retransmits the unit.

In addition, in an aspect of the present invention, there is provided a communication system according to claim 13, wherein said lower protocol changes a threshold which is used to judge that whether the transmission succeeds or not, in accordance with a frequency of the retransmission in said transmission station.

Therefore, in a communication system and a transmission station, it is possible to decrease the retransmission frequency of the data. As a result, it is possible to decrease the traffic on the line and also possible to shorten the transmission time of the data.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings:

FIG. 11 a conceptual diagram showing an example of a transmission error in a data signal;

FIG. 13 is a conceptual diagram showing another example of the format of a partial retransmission request signal;

FIG. 14 is a conceptual diagram showing another example of a transmission error in a data signal;

FIG. 15 is a sequence diagram showing a retransmission sequence using a lower protocol in a SELECTIVE REJECT retransmission method; and FIG. 16 is a sequence diagram showing a retransmission sequence using information in a lower protocol in a SELECTIVE REJECT retransmission method.

DESCRIPTION OF THE PREFERRED EMBODIMENTS

Figure 1:
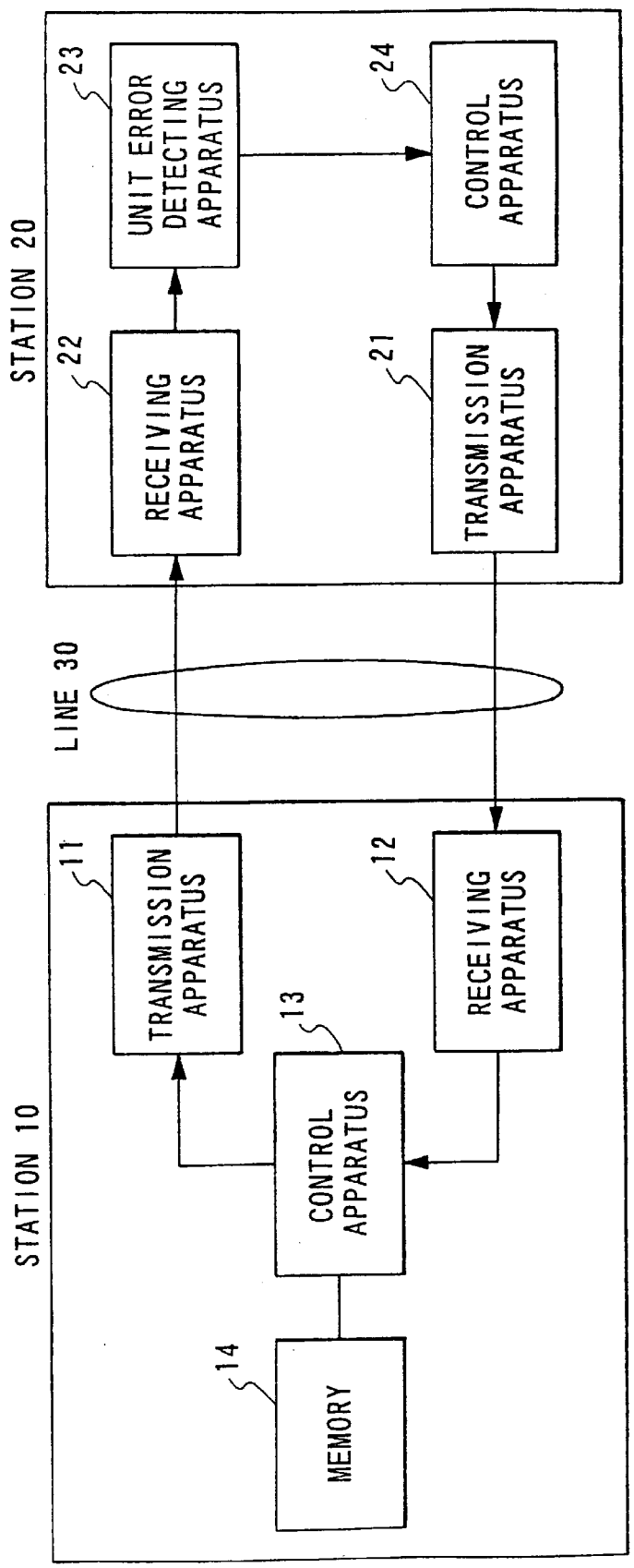
FIG. 1 is a block diagram showing a structural example of a communication system according to an embodiment of the present invention.

An explanation will now be made of preferred embodiments of the present invention with reference to the figures. FIG. 1 is a block diagram showing a structural example of a communication system according to an embodiment of the present invention. In FIG. 1, station 10 at the transmission side consists of transmission apparatus 11 which transmits a data signal to line 30, receiving apparatus 12 which receives a data signal from line 30, and control apparatus 13 which analyzes the signal received from station 20. Control apparatus 13 generates the data signal to be transmitted, and stores the data signal in memory 14.

Station 20 consists of transmission apparatus 21 which transmits a data signal and receiving apparatus 22 which receives a data signal. Unit error detecting apparatus 23 detects an error in part of the signal received by receiving apparatus 22. Control apparatus 24 generates an acknowledgment signal or a partial selection retransmission request signal on the basis of the information which is obtained from unit error detecting apparatus 23.

Figure 2:
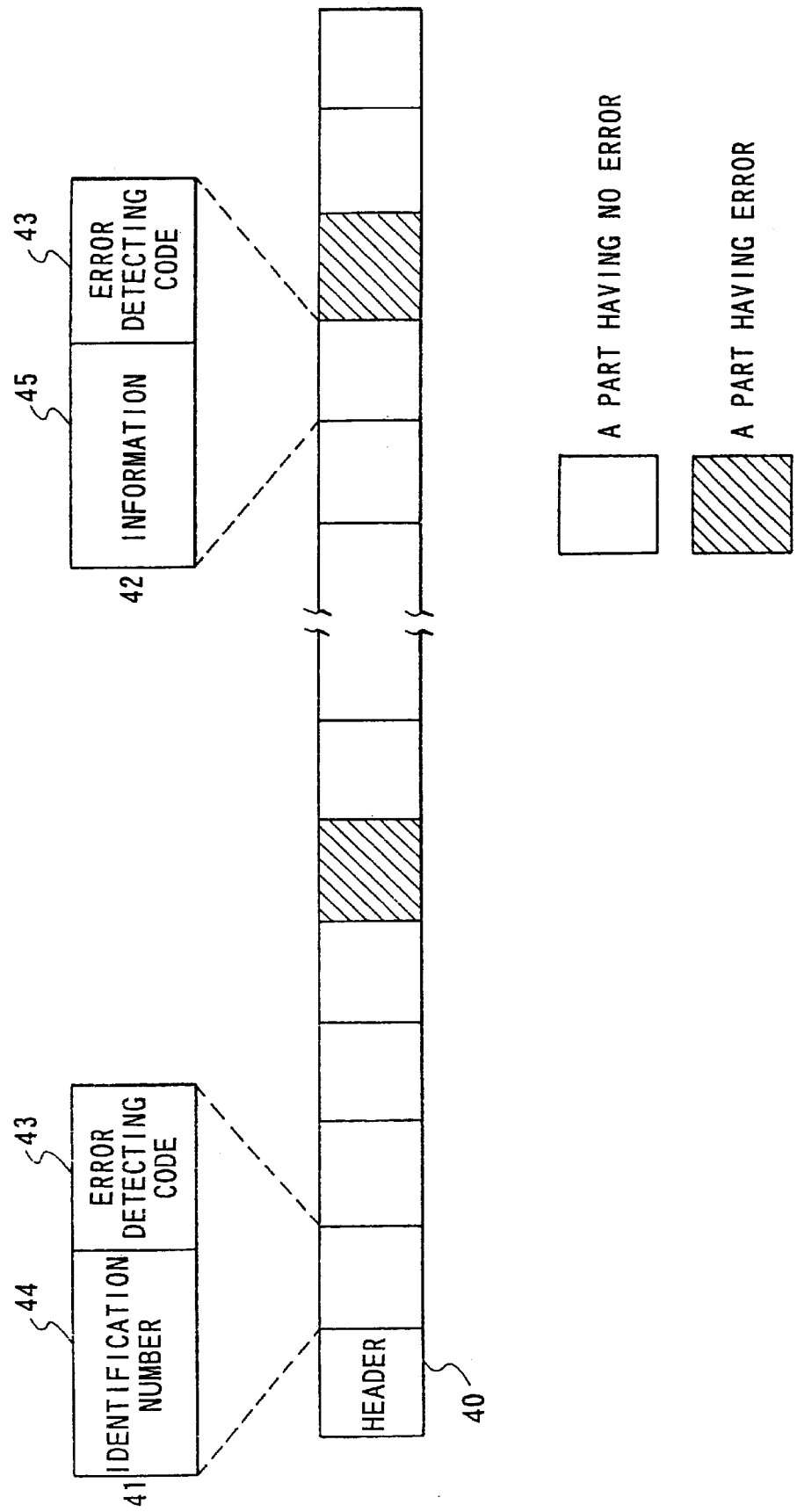
FIG. 2 is a conceptual diagram showing the structure of a data signal.

FIG. 2 is a conceptual diagram showing the structure of a data signal. The data signal has a header 40 showing that this frame is a data signal frame, which may be called just a "data signal" for simplicity, and includes head unit 41 and information units 42. Head unit 41 has identification number 44 for identifying the number of the data signal, and error detecting code 43 for detecting an error in head unit 41. Information unit 42 has information 45 including data which is transmitted from station 10 to station 20, and detecting code 43 for detecting an error in information unit 42.

Figure 3:
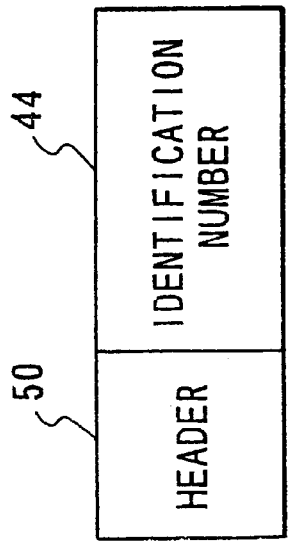
FIG. 3 is a conceptual diagram showing the structure of an acknowledgment signal.

FIG. 3 is a conceptual diagram showing the structure of an acknowledgment signal. The acknowledgment signal has header 50 showing that this frame is an acknowledgment signal frame, which may be called just an "acknowledgment signal" for simplicity, and includes identification number 44 for identifying a data signal which is received correctly.

Figure 4:
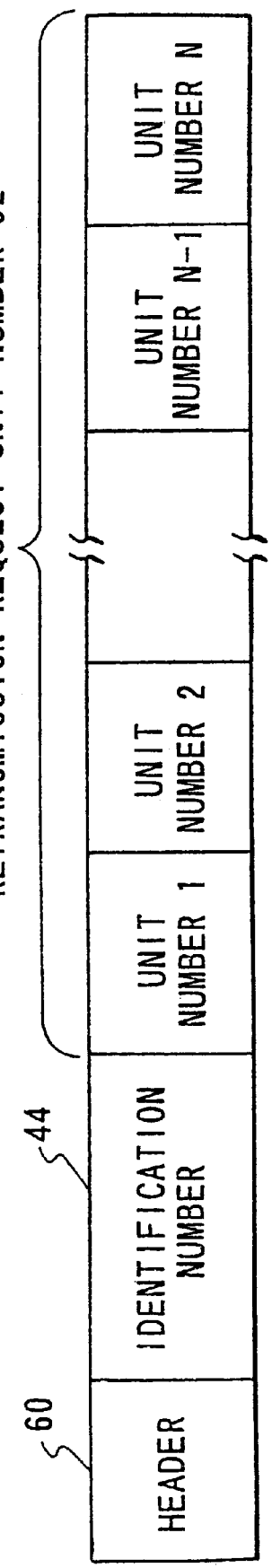
FIG. 4 is a conceptual diagram showing the structure of a partial selection retransmission request signal.

FIG. 4 is a conceptual diagram showing the structure of a partial selection retransmission request signal. The partial selection retransmission request signal has header 60 showing that this frame is a partial selection retransmission request signal frame, which may be called just a "partial selection retransmission request signal" for simplicity, and includes identification number 44 for identifying a data signal that has been received with an error, and retransmission request unit numbers 62 indicating information units in the data signal to be retransmitted. If there are a plurality of information units in a single data signal that include an error, then the partial selection retransmission request signal has a plurality of retransmission request units 62.

Figure 5:
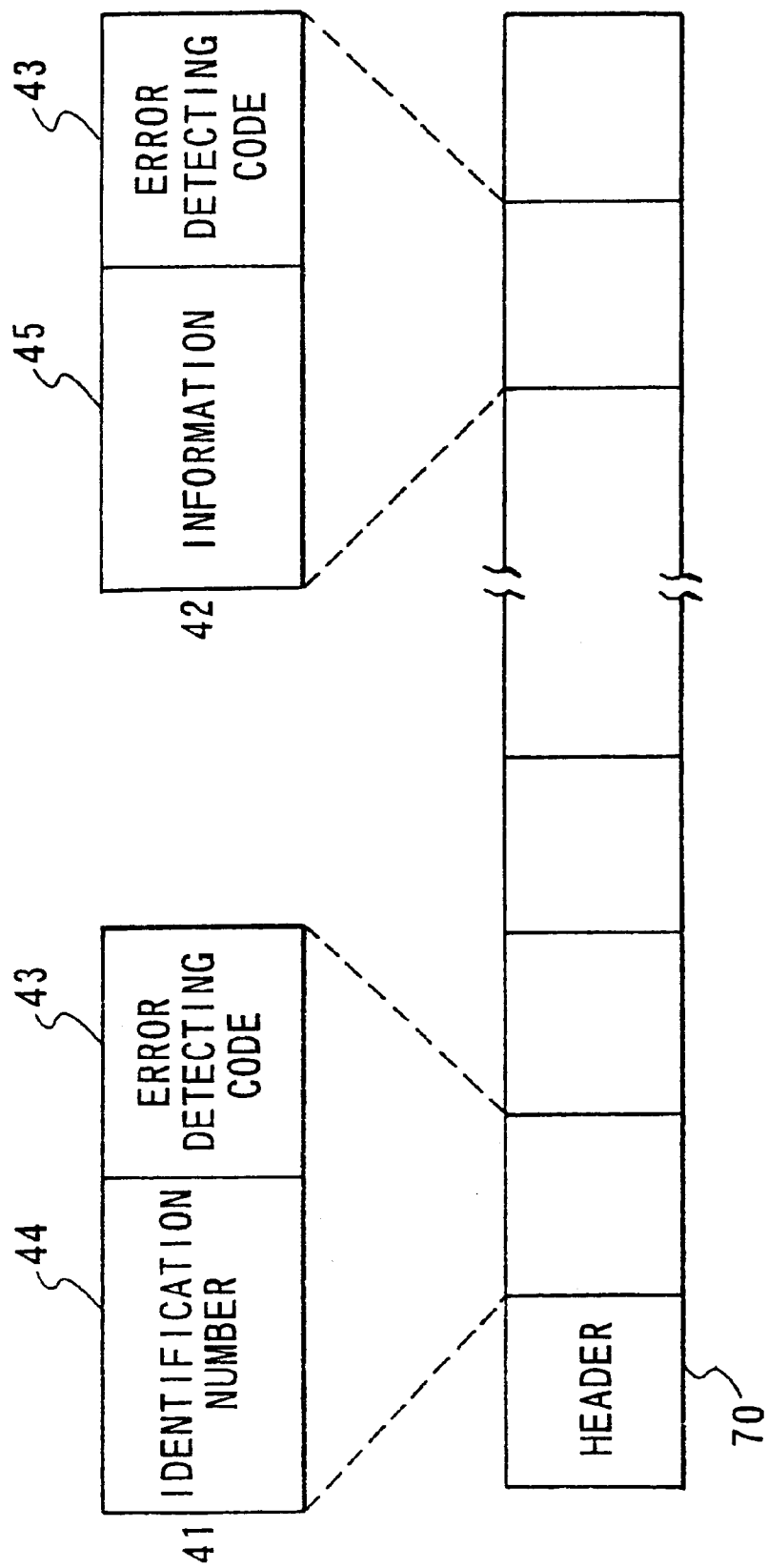
FIG. 5 is a conceptual diagram showing the structure of a retransmission data signal.

FIG. 5 is a conceptual diagram showing the structure of a retransmission data signal. A retransmission data signal has header 70 showing that this frame is a retransmission data signal frame or a retransmission data signal and includes information units 42 requested for retransmission by the partial selection retransmission request signal. A description of the structure of head unit 41 and information unit 42 is omitted because their structures are the same as that shown in FIG. 2. Information unit 42, for which retransmission has not been requested, is not included in the retransmission data signal.

Figure 6:
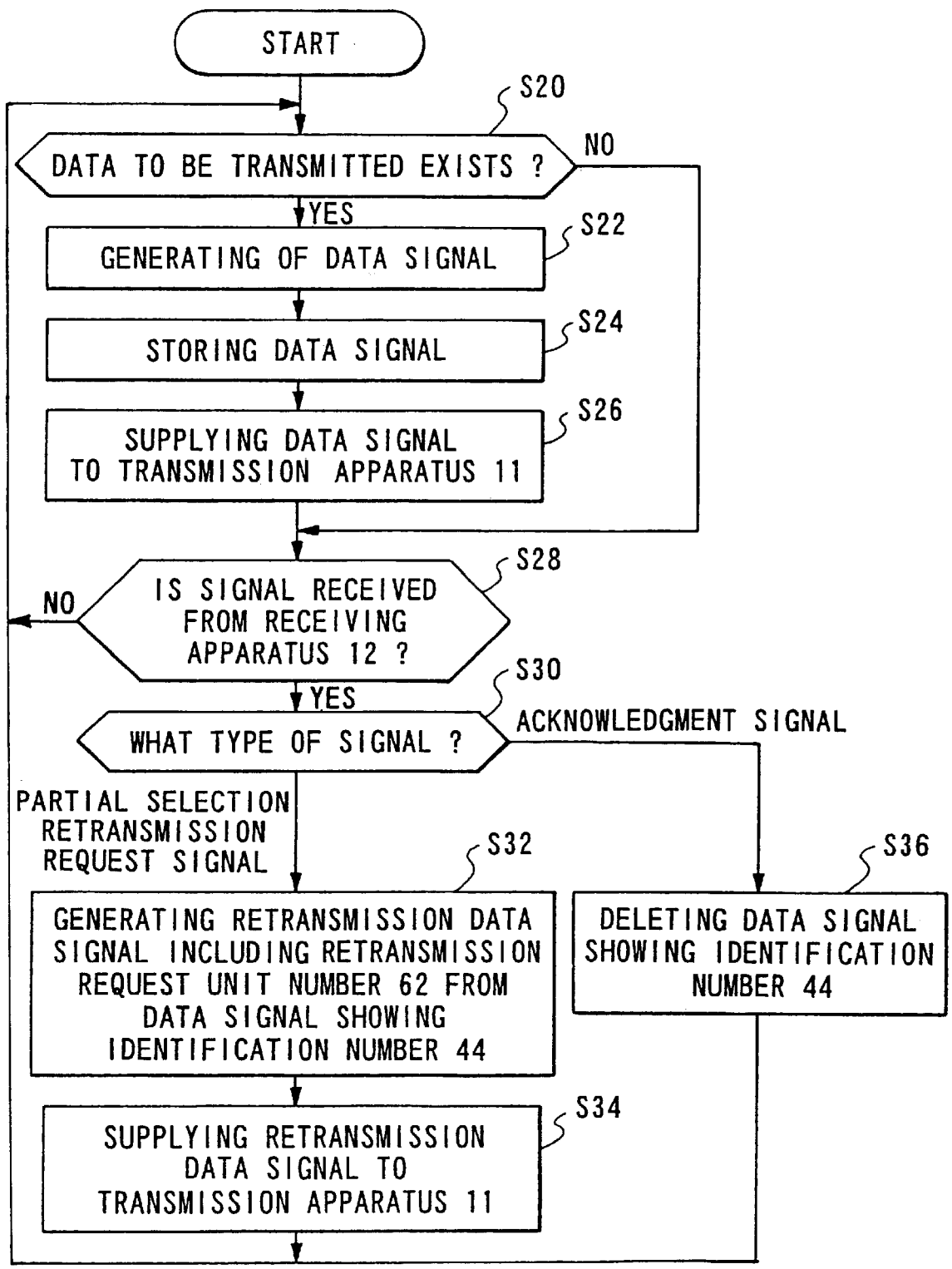
FIG. 6 is a flowchart showing the operation of control apparatus 13 in station 10.

FIG. 6 is a flowchart showing the operation of control apparatus 13 in station 10. When station 20 has data to be transmitted (S20), control apparatus 13 generates data signals (S22), and stores the data signals in memory 14 (S24). The stored data signals are supplied to transmission apparatus 11 in sequence (S26). When control apparatus 13 receives a signal from receiving apparatus 12 (S28), it determines the type of signal by reading a header (S30).

When the received signal is an acknowledgment signal, the data signal indicated by identification number 44 has been transmitted correctly to station 20. The data signal is therefore erased from memory 14 (S36). On the other hand, when the received signal is a partial selection retransmission request signal, the information units by identification number 44 and retransmission request unit number 62 of the selection retransmission request signal are read out from memory 14 (S34). By assembling those information units, control apparatus 13 generates a retransmission data signal (S32) and supplies the data signal to transmission apparatus 11 (S34). Transmission apparatus 11 transmits the data supplied from control apparatus 13 to line 30.

Figure 7:
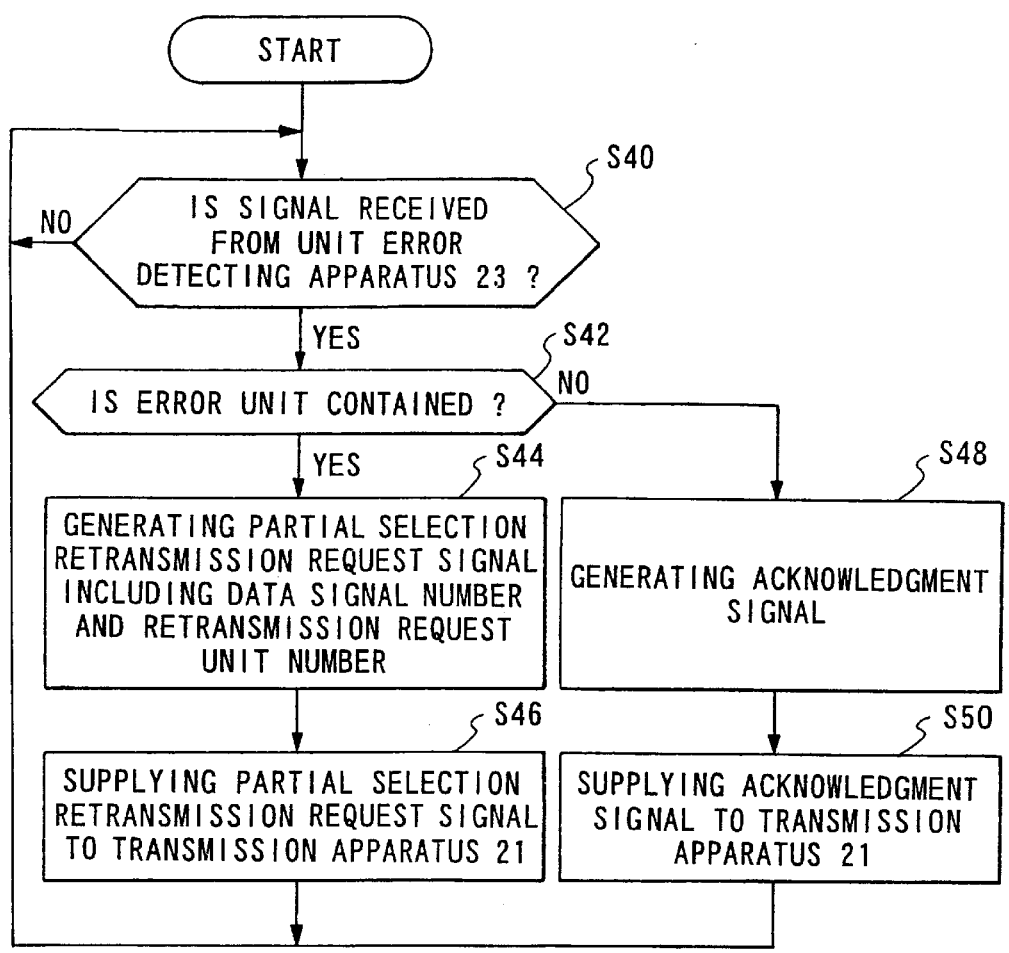
FIG. 7 is a flowchart showing the operation of station 20.

FIG. 7 is a flowchart showing the operation of station 20. Receiving apparatus 22 receives a data signal from line 30, and supplies the data signal to unit error detecting apparatus 23. Unit error detecting apparatus 23 judges whether an error exists in the received data signal or not, and supplies a signal indicating the existence of an error and the identification number of the received data signal (S40).

In the case where the received signal has an error, control apparatus 24 determines what the number is of the information unit having the error (S42). Next, control apparatus 24 generates a partial selection retransmission request signal which includes identification number 44 received from unit error detecting apparatus 23 and the number of the information unit which has the error (S44), and supplies this partial selection retransmission request signal to transmission apparatus 21 (S46).

When the received signal does not have an error (S42), control apparatus 24 generates an acknowledgment signal by using the identification number of the data signal received from the unit error detecting apparatus 23 (S48), and supplies the acknowledgment signal to transmission apparatus 21 (S50). Transmission apparatus 21 transmits the partial selection retransmission request signal or the acknowledgment signal which is generated by control apparatus 24 to line 30.

Figure 8:
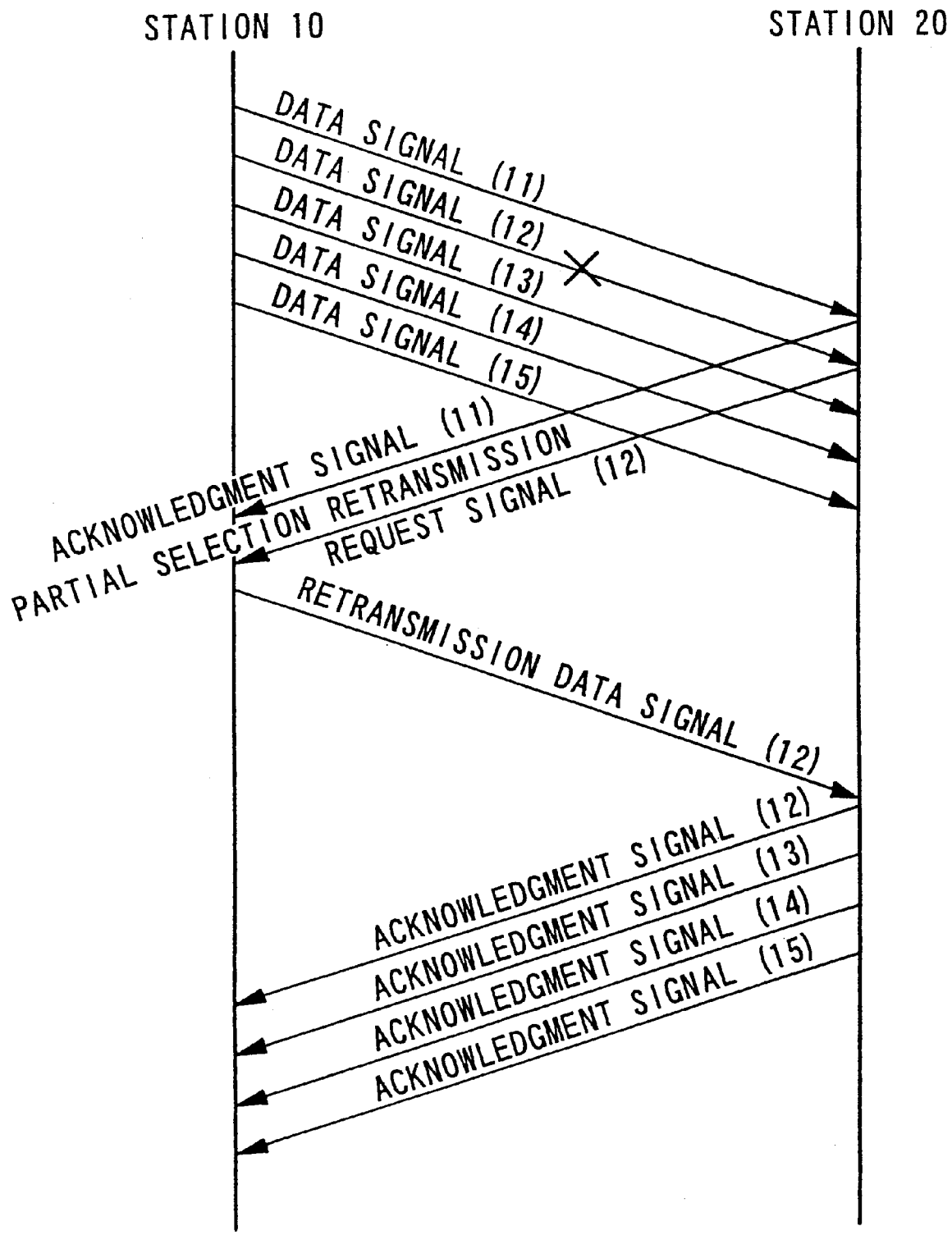
FIG. 8 is a sequence diagram showing the communication sequence of station 10 and station 20.
Figure 9:
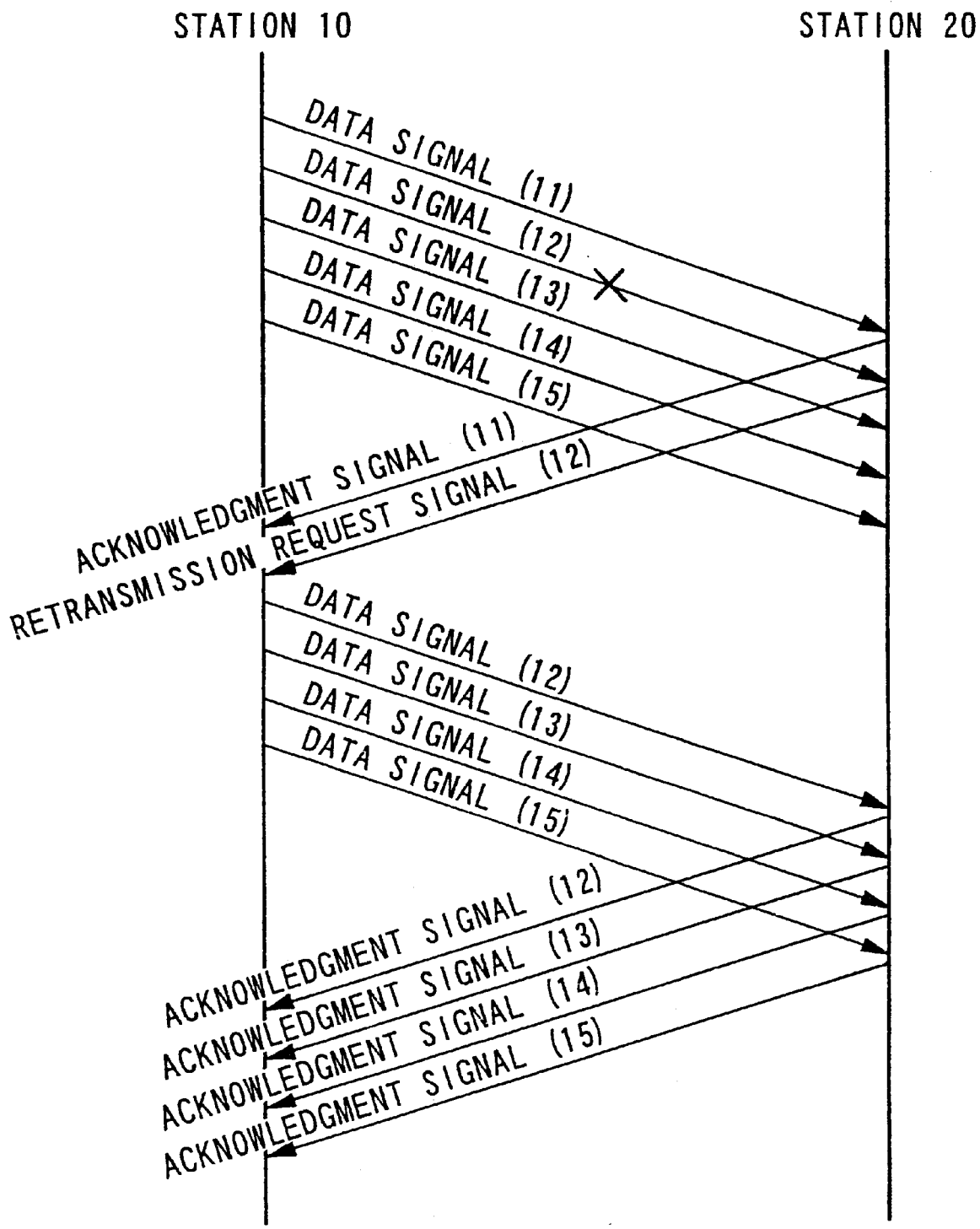
FIG. 9 is a sequence diagram showing the retransmission sequence of a data signal in a GO BACK N method.
Figure 10:
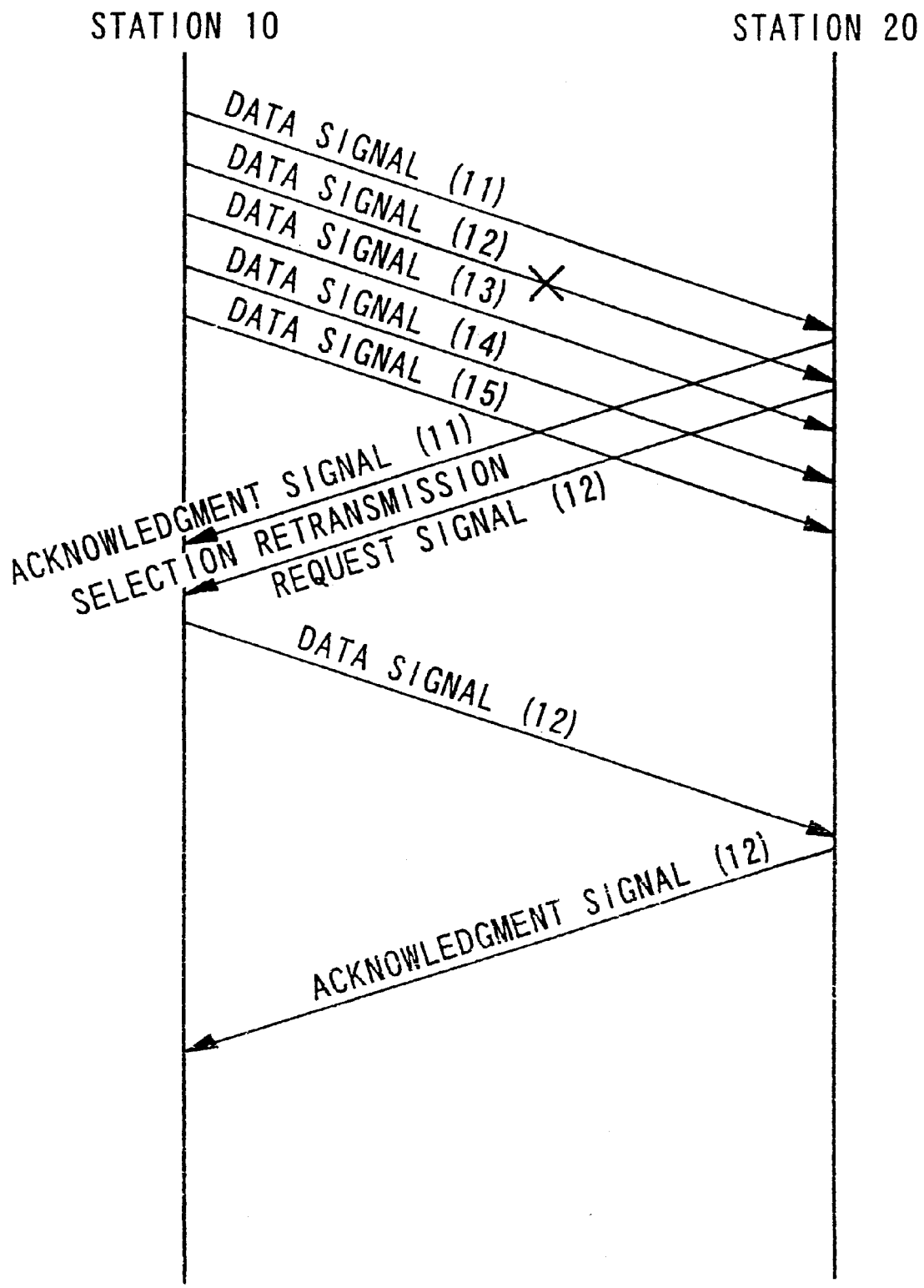
FIG. 10 is a sequence diagram showing the retransmission sequence of a data signal in a SELECTIVE REJECT retransmission method.

FIG. 8 is a sequence diagram showing the communication sequence of station 10 and station 20. Station 10 carries out outstanding transmission of data signal frame (11) through data signal frame (15). In FIG. 8, data signal (11) has been transmitted correctly, so that station 20 sends back acknowledgment signal (11) to station 10. In the case of data signal (12), however, an error occurs, so that station 20 transmits partial selection retransmission request signal (12).

Station 10 transmits retransmission data signal (12) when it receives partial selection retransmission request signal (12). In FIG. 8, retransmission data signal (12) has been transmitted correctly, so that station 20 then transmits acknowledgment signal (12). Station 20 then transmits acknowledgment signal (13) through acknowledgment signal (15), respectively. However, station 20 may directly transmit each of acknowledgment signal (13) through acknowledgment signal (15) immediately after it receives the respective data signals (13) through (15). In this case, only acknowledgment signal (12) is transmitted by station 20 later.

In this embodiment, only the information unit having an error is transmitted, so that retransmission data signal (12) becomes shorter than data signal (12). In particular, even if the quality of the line is poor, and the retransmission is carried out repeatedly, the length of the retransmission data signal becomes shorter as each retransmission is processed. Therefore, it is possible to decrease the traffic on the line, and to reduce the transmission time.

In addition, as the retransmission data signal becomes shorter, the probability that the retransmission data signal is retransmitted is decreased further. As a result, it is possible to effectively prevent the line from being disconnected due to retransmission in excess of a fixed number of times. In addition, it is possible to reduce the load of the switcher which is present on line 30 compared to the case where a large number of small data frames are transmitted.

ADDITIONAL EMBODIMENT (1)

FIG. 11 a conceptual diagram showing an example of a transmission error in a data signal. As shown in FIG. 4, in the preceding embodiment, in the case where errors occurred, each of the error units is designated in a partial selection transmission request signal. That is, when the data signal shown in FIG. 11 is received, it is necessary to designate units 4, 5, 6, 7, 8, 12, 17, 18, 19 respectively in the partial selection retransmission request signal. As a result, the more the number of error unit increases, the longer the signal of the partial selection retransmission request signal for designating the error unit becomes.

Figure 12:
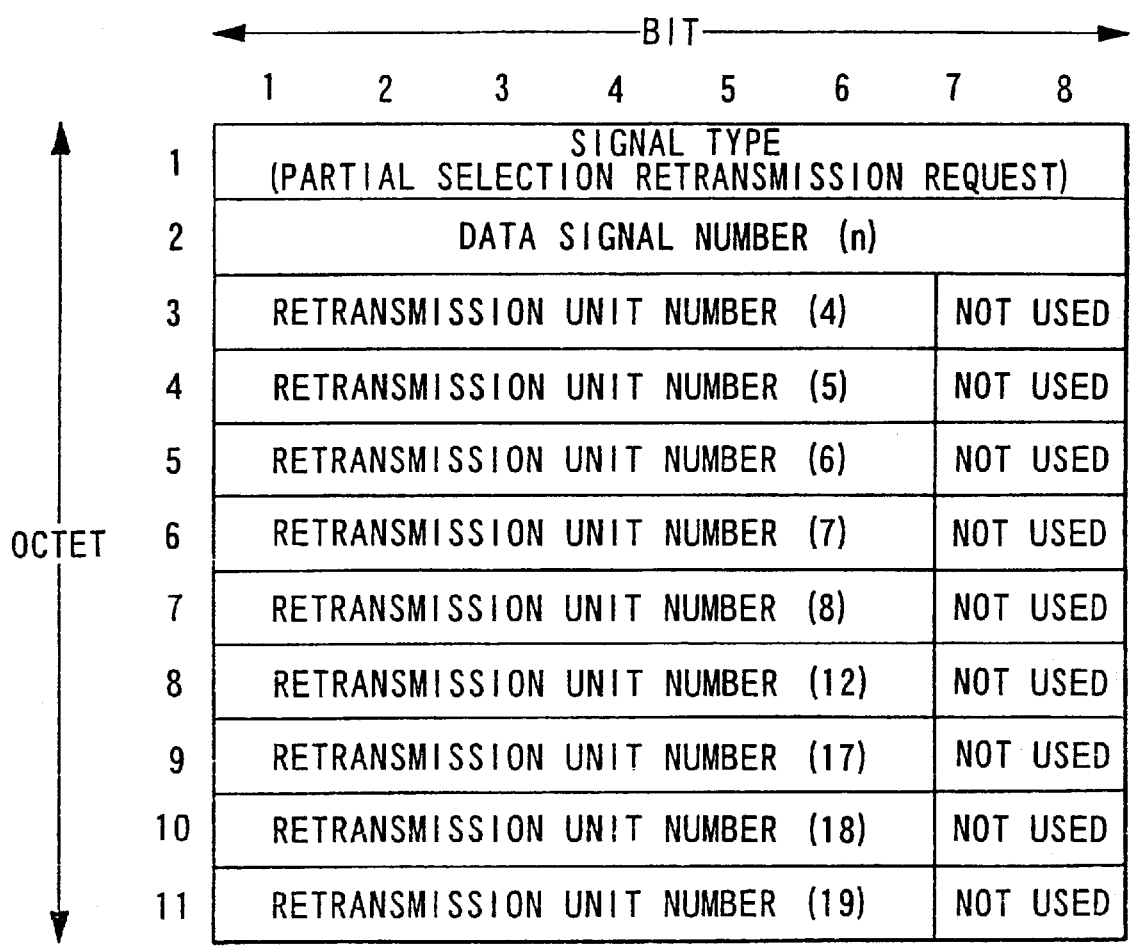
FIG. 12 is a conceptual diagram showing an example of the format of a partial retransmission request signal.

FIG. 12 is a conceptual diagram showing an example of the format of a partial retransmission request signal. First, octet 1 indicates that this frame is a partial selection retransmission request signal. Octet 2 indicates a data signal that has been received with errors. Octets 3–11 indicate information units in the data signal to be retransmitted. Furthermore, the number of the unit requesting the retransmission corresponds to the unit wherein an error occurs in the data signal shown in FIG. 1. As a result, in this format, the octet number is obtained by adding two to the number of the unit which requests the retransmission. Furthermore, the more the number of error units increases, the more the number of the octets increases, and the longer the partial selection retransmission request signal becomes.

On the other hand, FIG. 14 is a conceptual diagram showing another example of a transmission error in a data signal. The transmission error occurs in unit 12 and all units subsequent, that is, a burst error occurs in the all units. In the conventional technique, for the above-mentioned data signal, a partial selection request signal which consists of a data requesting the retransmission about unit 12 and all units subsequent, was proposed.

However, on rare occasions it may occur that a unit prior to a given unit was correct but errors occurred in the given unit and all units subsequent. As a result, partial selection request signals consisting of data requesting the retransmission for the given unit and all units subsequent the given unit are currently hardly in use.

As a result, in this embodiment, when a transmission error occurs continuously in the data signal, this continuous range is designated in the partial retransmission request signal. That is, when the data signal shown in FIG. 11 is received, units 4–8, 12, 17–19 are designated as the continuous range in the partial selection retransmission request signal. Therefore, the length of the partial selection retransmission request signal becomes shorter than that using the conventional technique.

FIG. 13 is a conceptual diagram showing another example of the format of a partial retransmission request signal. Octet 1 indicates that this frame is a partial selection retransmission request signal. Octet 2 indicates a data signal that has been received with errors. Octets 3–7 indicate information units in the data signal to which errors have occurred, together with continuation flags for indicating whether or not the errors have occurred continuously to subsequent units.

More specifically, octet 3 indicates unit 4, together with a continuation flag "1," which means that errors have occurred continuously to unit 4 and units subsequent to unit 4. Octet 4 indicates unit 8, together with the continuation flag "0," which means that an single error has occurred only to unit 8 and not to subsequent ones. Thus, octets 3 and 4 in combination indicate that errors have occurred continuously from unit 4 through unit 8.

Similarly, octet 5 shows that the retransmission of unit 12 is requested. Octets 6 and 7 in combination indicate that errors have occurred continuously from unit 17 through unit 19.

As described in above, the format shown in FIG. 13 can express a partial selection retransmission request signal having the same contents as the format shown in FIG. 12, and can shorten the length of the signal as compared to the format shown in FIG. 12.

ADDITIONAL EMBODIMENT (2)

FIG. 15 is a sequence diagram showing a retransmission sequence using a lower protocol in a SELECTIVE REJECT retransmission method. The lower protocol is disposed below the protocol of the above-mentioned embodiment. Generally, a random access protocol is applied to the lower protocol. Some protocols in a random access protocol can know whether the transmission side is successful in the transmission of each unit or not.

But, the information from the lower protocol about whether the transmission is successful or not is generally not very accurate. As a result, in the conventional technique, the transmission station does not respond to information supplied from the lower protocol as shown in FIG. 15 about whether the transmission was successful or not. The transmission station transmits the retransmission data signal for the first time when it receives the partial selection retransmission request signal.

Concretely, first, the upper protocol of the transmission station supplies data signal 1 to the lower protocol. Assume that a data to be sent is short enough to be able to be sent in one data signal frame. Data signal 1 has units 1, 2, 3, 4, 5 and 6. Data signal 1 is transmitted by the lower protocol. Herein, the lower protocol transmits data signal 1 for each unit. The lower protocol of the transmission station transmits the next unit each time it receives the information about whether each unit from the lower protocol of the receiving station was transmitted successfully or not. However, the lower protocol of the transmission station transmits next unit regardless of whether the unit transmission was successful or not.

On the other hand, the upper protocol of the receiving station receives data signal 2 which is the signal corresponding to data signal 1 from the lower protocol. Herein, data signal 2 is the signal from which units in which a transmission error occurred in data signal 1 have been deleted. That is, data signal 2 has units 1, 3, 4 and 6. Afterward, the receiving station transmits partial selection retransmission request signal 1 which requests retransmission of units 2 and 5.

Concretely, the upper protocol of the transmission station receives partial selection retransmission request signal 1 from the lower protocol as partial selection retransmission request signal 2. The upper protocol of the transmission station supplies retransmission data signal 1 corresponding to partial selection retransmission request signal 1 to the lower protocol. However, retransmission data signal 1 includes units 2 and 5.

The upper protocol of the receiving station receives retransmission data signal 2 which is the signal corresponding to retransmission data signal 1 from the lower protocol. The receiving station then transmits acknowledgment signal 1 to the transmission station when the transmission of retransmission data signal 2 succeeds. The transmission station then receives acknowledgment signal 2 which is the signal corresponding to acknowledgment signal 1 from the lower protocol. Hereby, the transmission about data signal 1 is completed.

FIG. 16 is a sequence diagram showing a retransmission sequence using information from a lower protocol in a SELECTIVE REJECT retransmission method. In this sequence, the transmission station recognizes units including a transmission error on the basis of the information from the lower protocol. The transmission station immediately transmits the retransmission data signal after the recognition.

In more detail, in FIG. 16, first of all, the upper protocol of the transmission station supplies data signal 1 to the lower protocol. Herein, data signal 1 has units 1, 2, 3, 4, 5 and 6. Data signal 1 is transmitted by the lower protocol. Herein, the lower protocol transmits data signal 1 for each unit. In this embodiment, the lower protocol transmits the information showing that unit 2 and unit 5 failed in the transmission, to the upper protocol of the transmission station. In accordance with the transmission of the information, the transmission station immediately transmits the retransmission data. However, this transmission data includes unit 2 and unit 5.

On the other hand, the receiving station receives data signal 2, which is the signal corresponding to data signal 1, from the lower protocol. Herein, data signal 2 is a signal from which units in which a transmission error occurred in data signal 1 are deleted. That is, data signal 2 has units 1, 3, 4 and 6. After that, the receiving station transmits partial selection retransmission request signal 1 which requests the retransmission of units 2 and 5.

Concretely, the upper protocol of the transmission station receives partial selection retransmission request signal 1 as partial selection retransmission request signal 2. But, units 2 and 5 designated in partial selection retransmission request signal 2 are already transmitted with retransmission data signal 1, so that the upper protocol of the transmission station does not carry out any operation for partial selection retransmission request signal 2.

The receiving station receives retransmission data signal 2 which is the signal corresponding to retransmission data signal 1 from the lower protocol. When the transmission of this retransmission data signal 2 succeeds, the receiving station transmits acknowledgment signal 1 to the transmission station. The transmission station then receives acknowledgment signal 2 which is the signal corresponding to acknowledgment signal 1 from the lower protocol. As a result, the transmission for data signal 1 is completed.

As mentioned above, in the transmission sequence shown in FIG. 15, the transmission station only carries out the partial retransmission after it receives the partial selection retransmission request signal. On the other hand, in the transmission sequence shown in FIG. 16, the transmission station starts to retransmit before it receives the partial selection retransmission request signal. As a result, transmission time T2 shown in FIG. 16 becomes shorter than transmission time T1 shown in FIG. 15, so that it may be understood that the transmission sequence shown in FIG. 16 is better than that shown in FIG. 15, regarding communication responsiveness.

In FIG. 16, the unit in which a transmission error occurred that was detected by the lower protocol, and the retransmitted unit designated by the partial selection retransmission request signal coincide with one another. If both units do not coincide, then the operation described below is carried out.

First of all, when there are units which are not retransmitted yet in the units designated by the partial selection retransmission request signal, the transmission station retransmits the units which are not retransmitted. Even in this case, the number of the units which are not retransmitted is less than that of units which are designated by the partial selection retransmission request signal in general, so that the transmission station completes the transmission sooner than the transmission sequence shown in FIG. 15.

On the other hand, when the units which are not designated by the partial selection retransmission request signal are also retransmitted, the transmission station and the receiving station do not carry out any operation for this retransmission. That is, the receiving station may leave the information about extra units which are retransmitted.

Next, an explanation will be made of a modified example of the embodiment shown in FIG. 16. In this modified example, the lower protocol consists of a changing means for changing the threshold which is used to judge whether the transmission succeeds or not, in accordance with the frequency with which the retransmission is carried out at the transmission station.

An explanation will be made of the modified example with reference to FIG. 1. Control apparatus 13 detects the number of times that retransmission is carried out in transmission apparatus 11 within a fixed time, and judges the frequency with which the retransmission is carried out. Control apparatus 13 then judges whether the frequency is high or low on the basis of the data stored in memory 14. Control apparatus 13 changes the threshold which is used to judge whether the transmission succeeds or not, in accordance with the judgment.

For example, when the frequency of the retransmission is high, the threshold is increased. Namely, by carrying out a more critical judgment of whether or not the transmission was successful, it is possible to increase the probability that the unit detected by the lower protocol in which a transmission error occurred and the retransmission unit designated by the partial selection retransmission request signal coincide. As a result, it is possible to decrease the frequency of the retransmission.

ADDITIONAL EMBODIMENT (3)

Next, an explanation will be made of another embodiment. In this embodiment, the length of the data signal which is transmitted at a time is changed according to the frequency with which transmission errors occur in the communication system. Herein, the frequency with which transmission errors occur is determined on the basis of the contents of the partial selection retransmission request signal or the frequency with which the partial selection retransmission request signal is transmitted. The length of the data is changed by changing the number of the units which are to be included in one data signal. The length of the data may also be changed by changing the amount of the information in each unit.

As mentioned above, according to this embodiment, for example, when the frequency of the transmission error is high, it is possible to improve the frequency of successful transmissions by shortening the length of the data signal. As a result, it is possible to improve the transmission speed of data because the frequency of retransmission becomes low. In addition, it is also possible to prevent the stopping of transmission due to the frequent occurrence of transmission errors. On the other hand, when the frequency of the transmission error is low, it is possible to decrease the information, such as the header added to each data signal by lengthening the data signal, and thus to improve the transmission speed of data.

This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A signal transmission method for transmitting, using an outstanding transmission technique, a data signal comprised of a plurality of frames from a transmitting station to a receiving station, said method comprising the steps of:

(a) fragmenting at said transmitting station each frame into a plurality of units each including an error detecting code;

(b) judging at said receiving station based on the error detecting codes whether or not each unit has been successfully received;

(c) transmitting to said transmitting station acknowledgements identifying frames in which all the units have been successfully received, and selective retransmission requests identifying frames in which any of the units are not successfully received and the units that are not successfully received; and (d) retransmitting to said receiving station only the units identified by the selective transmission requests.

2. A signal transmission method according to claim 1, wherein said selective retransmission request identifies a series of successive units that are not successfully received at said receiving station by pointing the first and the last units of said series and characterizing them as successive therebetween with a continuation flag, and when said continuation flag is detected in said selective retransmission request, said transmitting station retransmits a series of successive units from said first unit through said last unit.

3. A communication system for transmitting, using an outstanding transmission technique, a data signal comprised of a plurality of units from a transmitting station to a receiving station, said communication system comprising:

(a) means provided at said transmitting station for adding an error detecting code to each of said units;

(b) means provided at said transmitting station for assembling a first predetermined number of the units into a frame;

(c) means provided at said transmitting station for transmitting a set of frames in succession;

(d) means provided at said receiving station for judging based on said error detecting codes whether or not each unit has been successfully received;

(e) means provided at said receiving station for transmitting to said transmitting station acknowledgements identifying frames in the set in which all the units have been successfully received, and selective retransmission requests identifying frames in the set in which any of the units are not successfully received and the units that are not successfully received; and (f) means provided at said transmitting station for retransmitting to said receiving station only the unit identified by said selective transmission requests, wherein a new set of frames is not transmitted to said receiving station until said transmission station receives from said receiving station the acknowledgements acknowledging successful receipt of all the frames in the previous set.

4. A communication system according to claim 3, wherein said selective retransmission request signal identifies a series of successive units that are not successfully received at said receiving station by pointing the first and the last units of said series and characterizing them as successive therebetween with a continuation flag, and when said continuation flag is detected in said selective retransmission request, said transmitting station retransmits a series of successive units from said first unit through said last unit.

5. A communication system according to claim 4, wherein said transmitting station and said receiving station each have a plurality of protocols, a first protocol having a function of sending and receiving the data signals and a function of detecting whether or not each unit has been successfully received, and a second protocol having a function of generating said selective retransmission request and said acknowledgement and a function of generating the units to be retransmitted.

6. A communication system according to claim 3, wherein said transmitting station and said receiving station each have a plurality of protocols, a first protocol having a function of sending and receiving the data signals and a function of detecting whether or not each unit has been successfully received, and a second protocol having a function of generating said selective retransmission request and said acknowledgement and a function of generating the units to be retransmitted.

7. A communication system according to claim 6, wherein based on a frequency at which the unites have been retransmitted, said first protocol changes a threshold value for use in judging whether or not each unit has been successfully received.

8. A signal transmission method for transmitting data signals from a transmitting station to a receiving station, using an outstanding transmission technique, said method comprising the steps of:

sending from said receiving station to said transmitting station a request for retransmitting a portion of said data signal that is not successfully received; and changing at said transmitting station a length of data to be transmitted at a time based on an error frequency at which said data signal has not been successfully received at said receiving station.

9. A signal transmission method according to claim 8, wherein said error frequency is determined based on the content of said retransmission request.

10. A signal transmission method according to claim 8, wherein said data signal, before transmitted, is fragmented into a plurality of units, and the length of data to be transmitted at a time is changed by changing the number of the units in the data.

11. A signal transmission method according to claim 8, wherein said data signal, before transmitted, is fragmented into a plurality of units, and the length of data to be transmitted at a time is changed by changing an amount of data contained in the units.

* * * * *

UNITED STATES PATENT AND TRADEMARK OFFICE
CERTIFICATE OF CORRECTION

PATENT NO. : 6,021,516
DATED : February 1, 2000
INVENTOR(S) : Ichiro Okajima

It is certified that error appears in the above-identified patent and that said Letters Patent is hereby corrected as shown below:

CLAIMS

Claim 7,
Line 2, delete "unites" and substitute -- units -- in its place.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*